Feb. 4, 1941. H. F. GOODRICH 2,230,242
BALL AND SOCKET AUTOMATIC TRIP HITCH
Filed Sept. 16, 1938 2 Sheets-Sheet 1
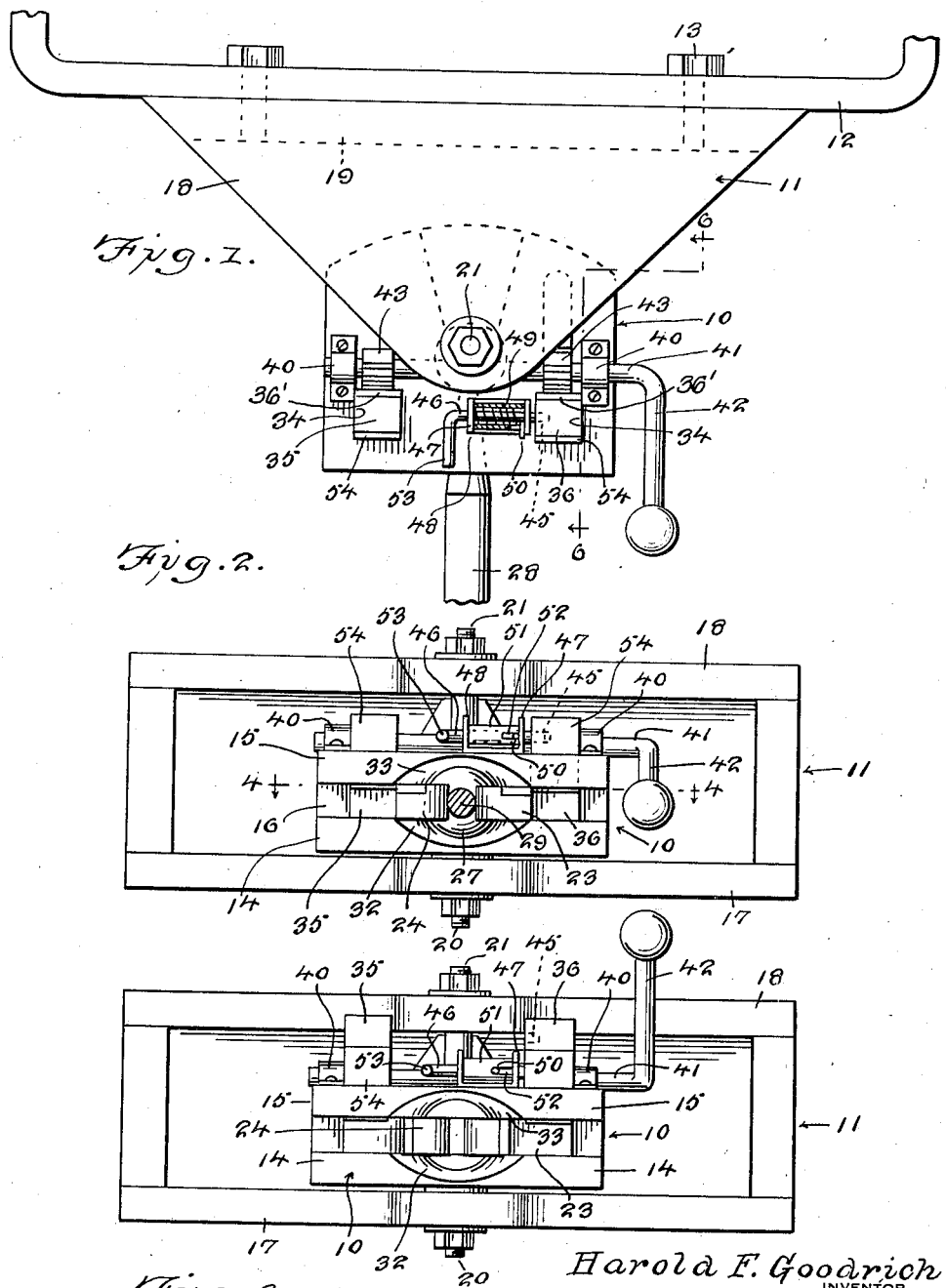
Harold F. Goodrich
INVENTOR
BY Victor J. Evans & Co.
ATTORNEYS Feb. 4, 1941.   H. F. GOODRICH   2,230,242
BALL AND SOCKET AUTOMATIC TRIP HITCH
Filed Sept. 16, 1938   2 Sheets-Sheet 2
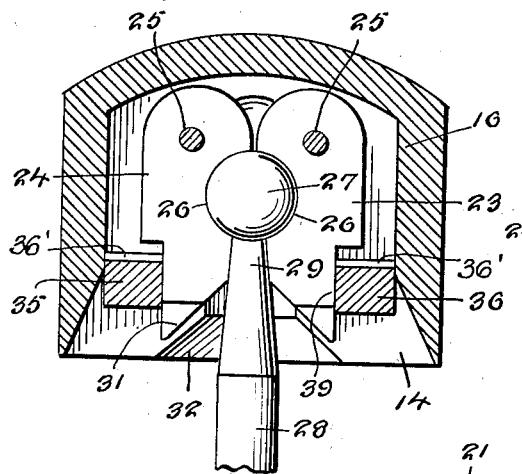
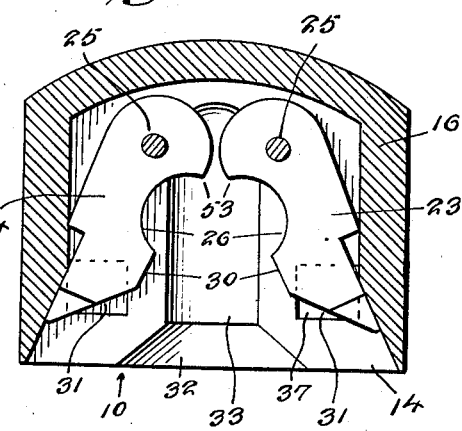
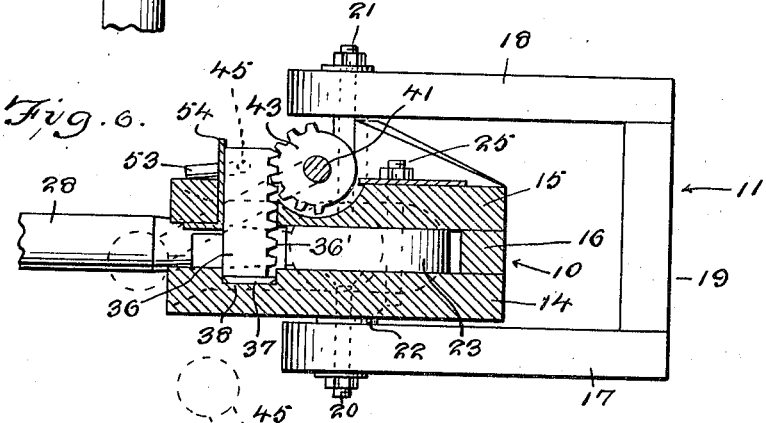
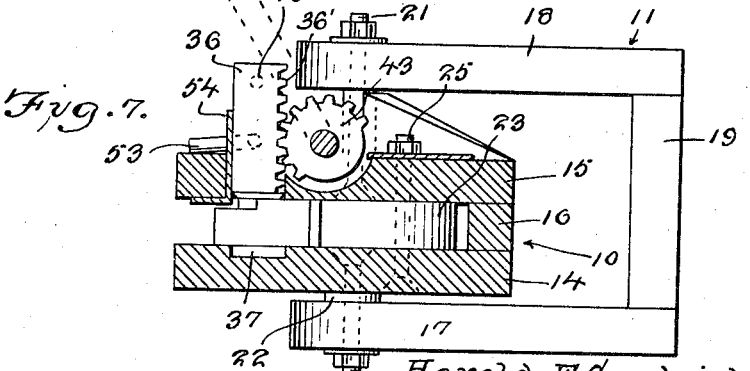
Harold F. Goodrich INVENTOR
BY Victor J. Evans & Co.
ATTORNEYS Patented Feb. 4, 1941

2,230,242

UNITED STATES PATENT OFFICE 2,230,242

BALL AND SOCKET AUTOMATIC TRIP HITCH

Harold F. Goodrich, Snohomish, Wash., assignor of one-half to L. A. Finley, Lake Stevens, Wash.

Application September 16, 1938, Serial No. 230,326

3 Claims. (Cl. 280—33.17)

My invention relates to trailer hitches and includes among its objects and advantages the provision of an improved automatic latching and unlatching mechanism. The hitch is designed for application to conventional truck and trailer equipment. The hitch embodies a socket unit adapted for pivotal connection with a truck, and the like, and includes a pair of latch dogs which are automatically shifted to latching position upon the coupling member by merely moving the latter into the socket unit and into pressure relation with the dogs. Novel rack means are included for positively holding the dogs in connected relation with the coupling member. A simple gear unit is associated with the rack means for moving the same out of holding relation with the dogs together with novel means for automatically latching the rack means in their dog holding position.

With these and other objects in view, this invention consists in certain novel features of construction, combination and arrangement of parts to be hereinafter more fully described and claimed.

For a complete understanding of my invention, reference is to be had to the following description and accompanying drawings, in which:

Figure 1 is a top plan view of my invention illustrating the manner in which it may be connected with a truck, or other vehicle;

Figure 2 is a front elevational view;

Figure 3 is a similar view showing the rack means elevated for releasing the dogs;

Figure 4 is a sectional view along the lines 4—4 of Figure 2 illustrating the dogs in latched relation with the coupling member;

Figure 5 is a similar view showing the dogs in unlatched position;

Figure 6 is a sectional view along the line 6—6 of Figure 1; and

Figure 7 is a similar view showing the rack means elevated for releasing the dogs.

In the embodiment selected to illustrate my invention the hitch 10 is pivotally connected with a bracket 11 attached to a draw bar, or beam 12, through the medium of bolts 13. Draw bar 12 is attached to the truck or other vehicle not shown.

Hitch 10 comprises plates 14 and 15 held in spaced relation through the medium of a spacer 16 which is generally U-shaped in configuration, as illustrated in Figures 4 and 5. Spacer 16 may be welded to the plates 14 and 15 while the latter are arranged in parallel relation as illustrated in Figures 6 and 7. Bracket 11 comprises flanges 17 and 18 welded to the plate 19 in which the bolts 13 are anchored. Flanges 17 and 18 are spaced to receive the hitch unit 10 and the latter is pivotally related to the bracket through the medium of king bolts 20 and 21, carried by the flanges 17 and 18 respectively. A washer 22 is mounted on the king bolt 12 intermediate the flange 17 and the plate 14.

Between the plates 14 and 15 I mount two latch dogs 23 and 24 which are pivotally connected at their inner ends by means of bolts 25 anchored in the plates 14 and 15. Figure 5 illustrates the specific construction of the dogs 23 and 24. Each is provided with a semi-circular recess 26 to closely embrace the ball 27 on the coupling member 28 which may be attached to the tongue of the trailer. In Figure 4 the coupling member 28 includes a neck 29 which is located between the reaches 30 of the dogs 23 and 24 when they are moved into latching relation with the coupling member.

Angular cam surfaces 31 are provided at the free ends of the dogs, while the plates 14 and 15 have camming surfaces 32 and grooves 33. Cam surfaces 32 facilitate entrance of the ball 27 while the grooves 33 provide accommodation for the ball 27 as the coupling member 28 is pushed home. Plate 15 is provided with square openings 34 for slidably supporting pins 35 and 36 each provided with a rack 36'. Pins 35 and 36 are arranged in right-angular relation to the plate 15 and the plate 14 is provided with recesses 37 for receiving the inner ends of the pins 35 and 36 when positioned according to Figure 6. The pins may be tapered as at 38 to facilitate entrance into the recesses 37 but the recesses are deeper than the degree of taper so as to perform an efficient holding action on the inner ends of the racks.

Pins 35 and 36 when positioned according to Figure 6 have pressure relation, as at 39, with the dogs 23 and 24 thus effectively holding the dogs in latched relation with the ball 27 of the coupling member 28. Upon the plate 15 I mount bearings 40 for rotatably supporting a shaft 41 having a crank or arm 42 for manual actuation. Pinions 43 are keyed to the shaft 41 and are arranged in mesh with the pins 35 and 36. Racks 36' for moving the pins through rotation of the pinions may be lifted to the dog releasing positions of Figure 7 through rotation of the shaft 41.

Pin 36 is provided with a bore 45 for the reception of one end of a latch bolt 46 slidably supported by a bracket 47 anchored to the plate 15. Upon the latch bolt 46 and between the flanges 48 of the bracket 47 I mount a compression spring 49. One end of the spring bears against one of the flanges 48 and a pin 50 fixedly connected with the lock pin 46 for urging the latter into the bore 45. With the lock pin 46 positioned in the bore 45 the rack 36' is positively latched in the position of Figure 6 so as to prevent accidental disconnection of the coupling member. The spring 49 may be inclosed within a tube 51 having a slot 52 for accommodating the pin 50. Lock pin 46 includes a right-angular reach 53 to permit manual withdrawal of the lock pin from the bore 45 thus permitting rotation of the shaft 41 for lifting the pins 35 and 36 out of latching relation with the dogs 23 and 24.

From the foregoing description of various parts of the device, the operation thereof will be readily understood. To connect the coupling member 28 with the hitch 10 the pins 35 and 36 are shifted to the position of Figure 7 and the dogs 23 and 24 pivoted to the position of Figure 5. The coupling member 28 is then backed into the hitch 10 as the bolt 27 engages the dogs 23 and 24 at the points 53 the dogs will be pivoted to the position of Figure 4 at which time the pins 35 and 36 drop to the positions of Figure 6. As the pins drop the spring 49 will urge the latch pin 46 to the position of Figure 1. To unlatch the coupling member the lock pin 46 is withdrawn and the pins 35 and 36 elevated through the medium of the crank 42 at which time the latch dogs are free to permit withdrawal of the coupling member. Hitch 10 pivots upon the king bolts 20 and 21 so as to accommodate angular or relative movement between the trailer and the pulling vehicle. Crank 42 may be manually actuated for positively elevating and lowering the pins 35 and 36. Backing plates 54 may be provided for the pins 35 and 36.

What is claimed is:

1. A trailer hitch comprising a bracket adapted for connection with a vehicle, a hitch unit pivotally connected with the bracket, a coupling member having a ball, said hitch unit comprising two spaced plates secured in fixed relation, dogs located between said plates and pivotally connected therewith, said dogs being recessed for receiving said ball to connect the coupling member with the hitch unit, one of said plates being provided with two openings and the other plate being provided with recesses aligning with said openings, pins movable in said openings and each adapted to have one end projected into one of said recesses, with the dogs lying between the pins and said ball, said pins, when projecting into said recesses, restraining the dogs from pivotal movement away from the ball, racks on said pins, and a manually actuated pinion means meshing with said racks for lifting the pins clear of said dogs, to permit the latter to be pivoted to open positions for releasing said ball.

2. A trailer hitch comprising a bracket adapted for connection with a vehicle, a hitch unit pivotally connected with the bracket, a coupling member having a ball, said hitch unit comprising two spaced plates secured in fixed relation, dogs located between said plates and pivotally connected therewith, said dogs being recessed for receiving said ball to connect the coupling member with the hitch unit, one of said plates being provided with two openings and the other plate being provided with recesses aligning with said openings, pins movable in said openings and each adapted to have one end projected into one of said recesses, with the dogs lying between the pins and said ball, said pins, when projecting into said recesses, restraining the dogs from pivotal movement away from the ball, racks on said pins, a crank actuated shaft rotatably mounted on one of said plates, pinions keyed to said shaft and meshing with said racks for lifting the pins clear of said dogs, to permit the latter to pivot to open positions for releasing said ball, one of said pins being provided with a bore, and a spring pressed latch pin adapted to be inserted in said bore for latching that pin against movement when in a dog holding position and to restrain the shaft from accidental rotation to hold the other pin in a dog holding position.

3. A trailer hitch comprising a bracket adapted for connection with a vehicle, a hitch unit pivotally connected with the bracket, a coupling member having a ball, said hitch unit comprising two spaced plates secured in fixed relation, said plates being spaced less than the diameter of said ball and provided with opposed recesses forming a track for said ball, dogs positioned between said plates and pivotally connected thereto, said dogs having opposed recesses to receive said ball when the dogs are pivoted against the coupling member, one of said plates being provided with two openings and the other plate being provided with recesses aligning with said openings, pins movable in said openings and each adapted to have one end projected into one of said recesses, with the dogs lying between the pins and the coupling member, said pins, when projected into said recesses, restraining the dogs from pivotal movement away from the coupling member, and manually actuated means operatively connected with said pins for shifting the latter clear of said dogs to permit the latter to be pivoted to open positions for releasing said ball.

HAROLD F. GOODRICH.